United States Patent
Sasaki

(10) Patent No.: US 10,260,553 B2
(45) Date of Patent: Apr. 16, 2019

(54) INPUT DEVICE

(71) Applicant: AUTOLIV NISSIN BRAKE SYSTEMS JAPAN CO., LTD., Yokohama-shi, Kanagava (JP)

(72) Inventor: Tetsuo Sasaki, Nagano (JP)

(73) Assignee: AUTOLIV NISSIN BRAKE SYSTEMS JAPAN CO., LTD., Yokohama-shi (JP)

(*) Notice: Subject to any disclaimer, the term of this patent is extended or adjusted under 35 U.S.C. 154(b) by 35 days.

(21) Appl. No.: 15/388,253

(22) Filed: Dec. 22, 2016

(65) Prior Publication Data

US 2017/0184148 A1 Jun. 29, 2017

(30) Foreign Application Priority Data

Dec. 24, 2015 (JP) .................................. 2015-252679

(51) Int. Cl.
 *F16C 11/06* (2006.01)
 *B60T 11/18* (2006.01)
 *F16B 7/04* (2006.01)

(52) U.S. Cl.
 CPC ........... *F16C 11/0638* (2013.01); *B60T 11/18* (2013.01); *F16B 7/0406* (2013.01); *F16C 11/069* (2013.01)

(58) Field of Classification Search
 CPC ........ F16C 7/04; F16C 11/06; F16C 11/0619; F16C 11/0623; F16C 1/0628; F16C 11/0633; F16C 11/0638; F16C 11/0666; F16C 11/0685; F16C 11/069;
 (Continued)

(56) References Cited

U.S. PATENT DOCUMENTS 3,226,141 A * 12/1965 Sullivan .............. F16C 11/0633
 384/203
3,545,797 A * 12/1970 Korecky ............. F16C 11/0638
 403/140

(Continued)

FOREIGN PATENT DOCUMENTS

DE 19526898 2/1996
DE 102006045809 A1 * 4/2008 .......... F16C 11/0638
(Continued)

OTHER PUBLICATIONS

Machine translation of JP 2015-080986 A obtained on Mar. 22, 2018. (Year: 2018).*

(Continued)

*Primary Examiner* — Adam D Rogers
(74) *Attorney, Agent, or Firm* — Andrew M. Calderon; Roberts Mlotkowski Safran Cole & Calderon, P.C.

(57) ABSTRACT

An input device includes an input rod, a piston, and a cylindrical member. The cylindrical member includes a rod, a locking part, and a slit. The rod receiving part is provided on one end side in an axial direction and configured to receive the end part of the input rod. The locking part is formed on the other end side in the axial direction so as to lock an engaging part of the piston, thereby preventing the input rod from falling off the piston. The slit is formed over the length of the whole of the cylindrical member in the axial direction. The cylindrical member can be elastically deformed in a radial direction due to the slit.

20 Claims, 7 Drawing Sheets

(58) Field of Classification Search
CPC ........ F16C 11/086; F16C 11/106; B60T 7/04; B60T 11/18; F16B 7/0406; B64C 27/327
See application file for complete search history.

(56) References Cited

U.S. PATENT DOCUMENTS

| | | | | |
|---|---|---|---|---|
| 4,286,363 | A | * | 9/1981 | Morin .................... B23P 11/00 29/446 |
| 4,666,330 | A | | 5/1987 | O'Connell |
| 5,163,773 | A | * | 11/1992 | Denney ................ F16C 11/069 403/133 |
| 5,499,570 | A | * | 3/1996 | Bergelin ................ B60T 13/52 403/133 |
| 5,509,748 | A | * | 4/1996 | Idosako ............. F16C 11/0638 384/203 |
| 5,553,690 | A | | 9/1996 | Takahashi |
| 7,985,034 | B2 | * | 7/2011 | Ruste ................ F16C 11/0638 403/133 |
| 8,747,012 | B2 | * | 6/2014 | Byrnes .................. B62D 7/166 403/122 |
| 8,850,955 | B2 | * | 10/2014 | Isakson .................. B60T 11/18 92/187 |
| 2006/0140711 | A1 | * | 6/2006 | Morales Arnaez ........................ F16C 11/0638 403/122 |
| 2015/0005080 | A1 | | 1/2015 | Chu |

FOREIGN PATENT DOCUMENTS

| | | | | |
|---|---|---|---|---|
| DE | 102007008748 | | 1/2009 | |
| DE | 102010029137 | A1 * | 11/2011 | .......... F16C 11/0638 |
| JP | 60176859 | | 9/1985 | |
| JP | 2006300264 | A * | 11/2006 | .......... F16C 11/0638 |
| JP | 200709958 | | 4/2007 | |
| JP | 2007099058 | | 4/2007 | |
| JP | 2010156466 | | 7/2010 | |
| JP | 2015047975 | | 3/2015 | |
| JP | 2015080986 | | 4/2015 | |
| WO | 2006019145 | | 2/2006 | |
| WO | WO-2015114842 | A1 * | 8/2015 | ............. B60T 7/042 |

OTHER PUBLICATIONS

EP Search Report in related EP Application No. 16206631.0-1762 dated Apr. 5, 2017, 7 pages.
Japanese Office Action in related JP Application No. 2015-252679 dated Feb. 6, 2018, 6 pages.

* cited by examiner

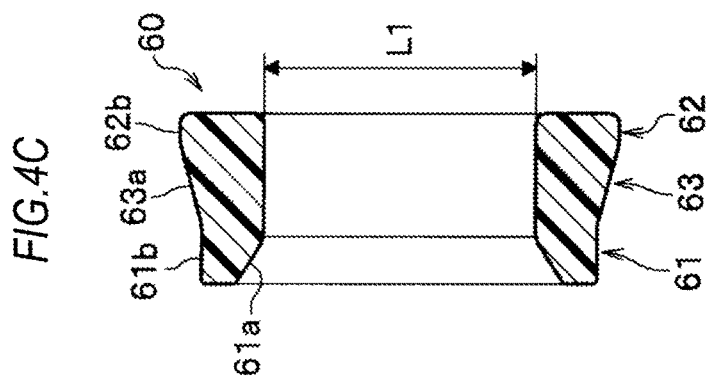
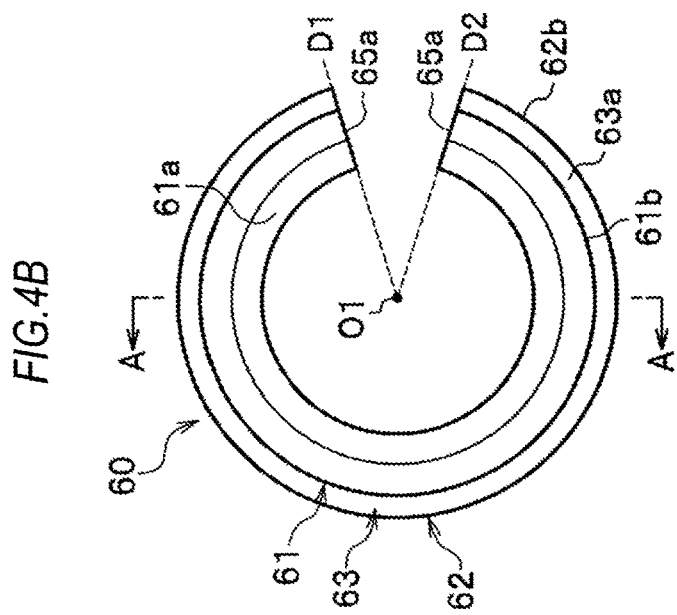
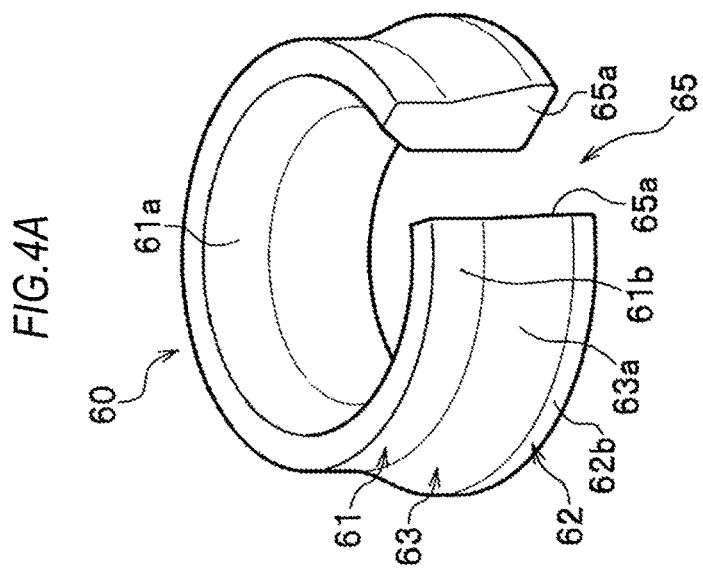

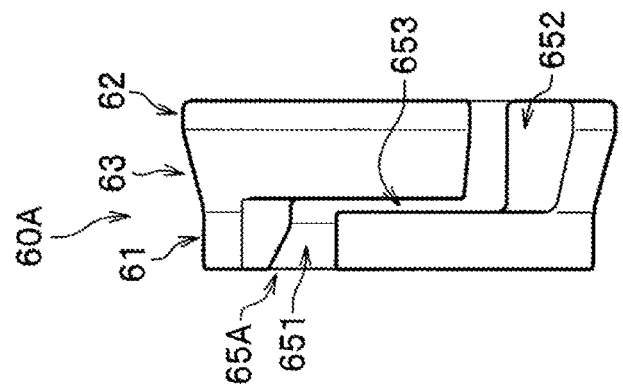
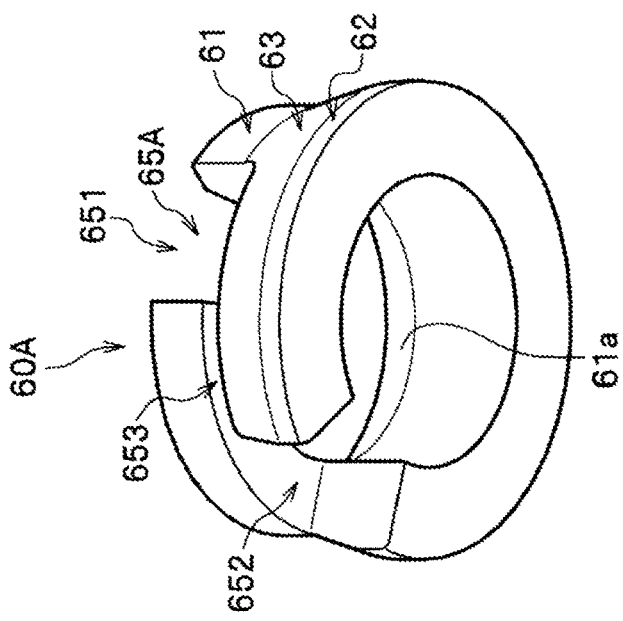
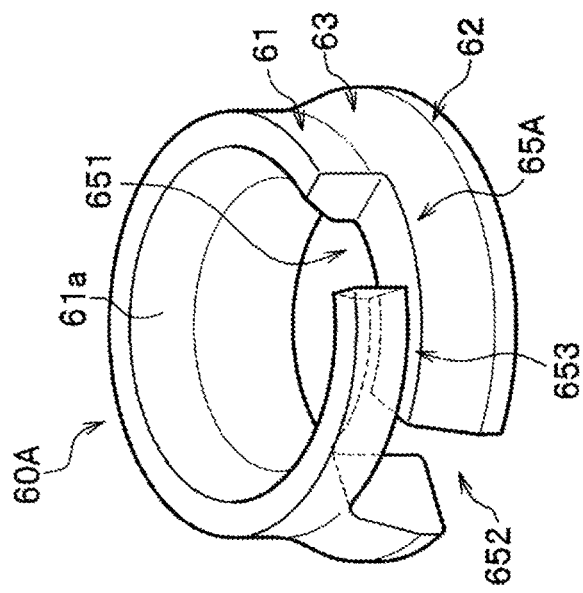

INPUT DEVICE

CROSS-REFERENCE TO RELATED APPLICATION

This application claims priority from Japanese Patent Application No. 2015-252679 filed on Dec. 24, 2015, the entire contents of which are incorporated herein by reference.

FIELD

The present disclosure relates to an input device.

BACKGROUND

In the related art, as an input device such as a master cylinder connected to a brake operation element, an input device disclosed in Japanese Patent Application Laid-Open No. 2007-99058 is known.

Japanese Patent Application Laid-Open No. 2007-99058 discloses a configuration in which a spherical head part formed at an end part of an input rod is assembled in a piston so as to be swingable.

In the input device of Japanese Patent Application Laid-Open No. 2007-99058, it is required to swage an end part of the piston such that the head part of the input rod is held in the piston so as to be swingable. Therefore, there is a problem that machining man-hours increase, resulting in an increase in cost.

SUMMARY

The present disclosure was made in view of the above-described point, and an object of the present disclosure is to provide an input device capable of improving productivity while reducing cost.

An input device of the present disclosure, which is devised in order to solve the above-described problem, includes an input rod capable of forward and rearward movement on the basis of an amount of operation on an operation element, a piston which can be displaced in response to forward and rearward movement of the input rod, and a cylindrical member made of a resin and fit on an end part of the input rod. The cylindrical member includes a rod receiving part provided on one end side in an axial direction and configured to receive the end part of the input rod, a locking part formed on the other end side in the axial direction so as to lock an engaging part of the piston, thereby preventing the input rod from falling off the piston, and a slit formed over the length of the whole of the cylindrical member in the axial direction. The cylindrical member can be elastically deformed in a radial direction due to the slit.

According to this configuration, locking of the input rod is implemented by the locking part of the cylindrical member made of the resin. Since it is possible to perform locking by assembling the cylindrical member in the above-described way, it is possible to omit a process of swaging the piston, and it is possible to improve the productivity while reducing the cost.

Also, since the slit is formed over the length of the whole of the cylindrical member in the axial direction, it is possible to elastically deform the whole of the cylindrical member in the radial direction. As described above, it is possible to insert the cylindrical member in the piston, for example, by deforming the whole of the cylindrical member toward the inner side in the radial direction. Therefore, assembling is very easy. Also, for example, when the cylindrical member receives a force in such a direction that the input rod may fall off the piston, the whole of the cylindrical member can deform toward the outer side in the radial direction such that the whole of an outer surface of the cylindrical member comes into contact with an inner surface of the piston by. In this case, since the contact area of the cylindrical member with the piston increases, resulting in an increase in withstand load, appropriate locking of the input rod is implemented.

Also, since the slit can cause resilience of the rod receiving part relative to the end part of the input rod, it is possible to eliminate backlash of the input rod in the axial direction.

Also, in the input device, the slit may be formed in a straight line shape along the axial direction. In this way, it is possible to easily implement a configuration in which the whole of the cylindrical member can elastically deform in the radial direction.

Also, in the input device, the slit may include a first slit formed at least in the rod receiving part, a second slit formed at least in the locking part so as to have a position different from that of the first slit in a circumferential direction, and a third slit connecting the first slit and the second slit. According to this configuration, since it is possible to prevent the slit from being formed only in a part of the cylindrical member narrow in the circumferential direction, it is possible to improve the holding balance of the cylindrical member.

Also, in the input device, side surfaces of the slit may be formed along a radial direction of the cylindrical member. According to this configuration, it is possible to easily form the slit with a predetermined width. Also, even though the slit has a requisite minimum width, it is possible to improve holding of the input rod during a normal time while making it possible to deform the cylindrical member toward the inner side in the radial direction during assembling, and it is possible to appropriately implement deformation of the cylindrical member toward the outer side in the radial direction when the cylindrical member receives a force in such a direction that the input rod may fall off the piston.

Also, in the input device, when the cylindrical member receives a force in such a direction that the input rod falls off the piston, the cylindrical member may deform toward the outer side in the radial direction such that at least a part of an outer surface of the cylindrical member comes into contact with an inner surface of the piston. According to this configuration, since the contact area of the cylindrical member with the piston increases, the holding power of the cylindrical member increases, and appropriate locking of the input rod is implemented.

Also, in the input device, the whole of an outer surface of the cylindrical member may come into contact with an inner surface of the piston. According to this configuration, the holding power of the cylindrical member in the piston effectively improves, and more appropriate locking of the input rod is implemented.

According to the present disclosure, it is possible to improve the productivity while reducing the cost.

BRIEF DESCRIPTION OF DRAWINGS

FIGS. 4A to 4C are views illustrating a cylindrical member which is included in the input device. More specifically, FIG. 4A is a perspective view as obliquely seen from the front side, and FIG. 4B is a front view, and FIG. 4C is a cross-sectional view taken along a line A-A of FIG. 4B.

FIGS. 7A to 7C are views illustrating a modification of the cylindrical member. More specifically, FIG. 7A is a perspective view as obliquely seen from the front side, and FIG. 7B is a perspective view as obliquely seen from the rear side, and FIG. 7C is a side view.

DETAILED DESCRIPTION

Hereinafter, an embodiment of the present disclosure will be described in detail with reference to the accompanying drawings. An input device according to the present disclosure can be applied to a brake fluid pressure control device 1 shown in FIG. 1.

Figure 1:
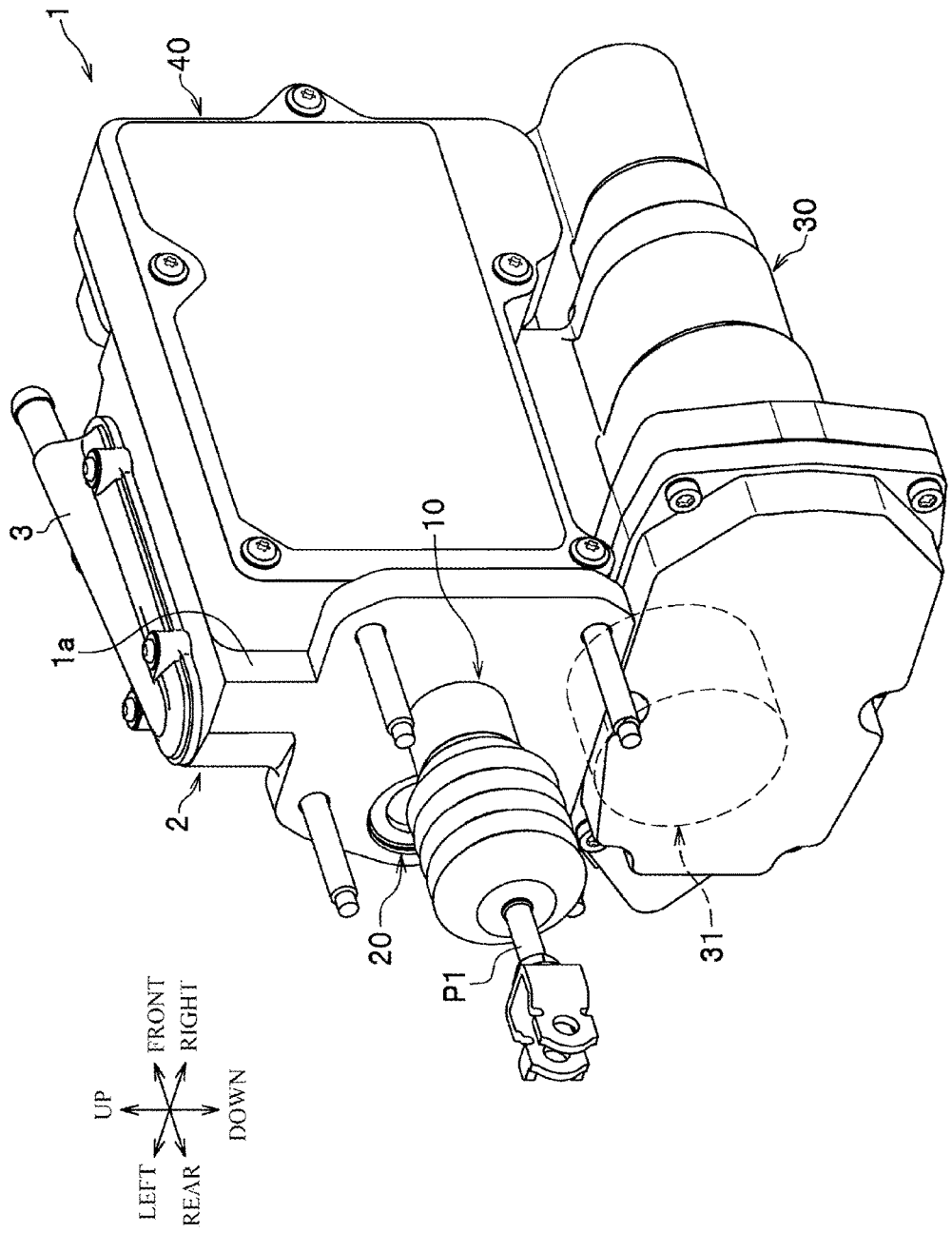
FIG. 1 is a perspective view illustrating the external appearance of a brake fluid pressure control device to which an input device according to an embodiment of the present disclosure can be applied.

As shown in FIG. 1, the brake fluid pressure control device 1 includes a master cylinder 10, a stroke simulator 20, a slave cylinder 30, and a fluid pressure control device 40. The brake fluid pressure control device 1 can be mounted not only on a vehicle using only an engine (an internal combustion engine) as a power source but also on any other vehicle, such as a hybrid vehicle using both of an engine and a motor as power sources, or an electric vehicle or a fuel cell vehicle using only a motor as a power source. Also, the brake fluid pressure control device 1 includes both of a brake-by-wire type brake system configured to operate during activation of a power source (such as an engine or an electric motor) and a hydraulic type brake system configured to operate during stop of the power source or the like.

In the brake fluid pressure control device 1 of the present disclosure, the master cylinder 10, the stroke simulator 20, the slave cylinder 30, an electric motor 31 for driving the slave cylinder 30, and the fluid pressure control device 40 are provided on one metal base 2. Also, a reservoir 3 is formed on the upper part of the base 2. In this way, the master cylinder 10, the stroke simulator 20, the slave cylinder 30, the electric motor 31, and the fluid pressure control device 40 are configured as a single unit.

Also, two brake systems are provided in the base 2. One brake system has hydraulic passages extending from the master cylinder 10 to two wheel brakes (which are for a left front wheel and a right rear wheel and are not shown in the drawings), and the other brake system has hydraulic passages extending from the master cylinder 10 to the other wheel brakes (which are for a left rear wheel and a right front wheel). Also, other components such as hydraulic passages, pressure sensors, electromagnetic valves, and changeover valves are provided in the base 2.

Figure 2:
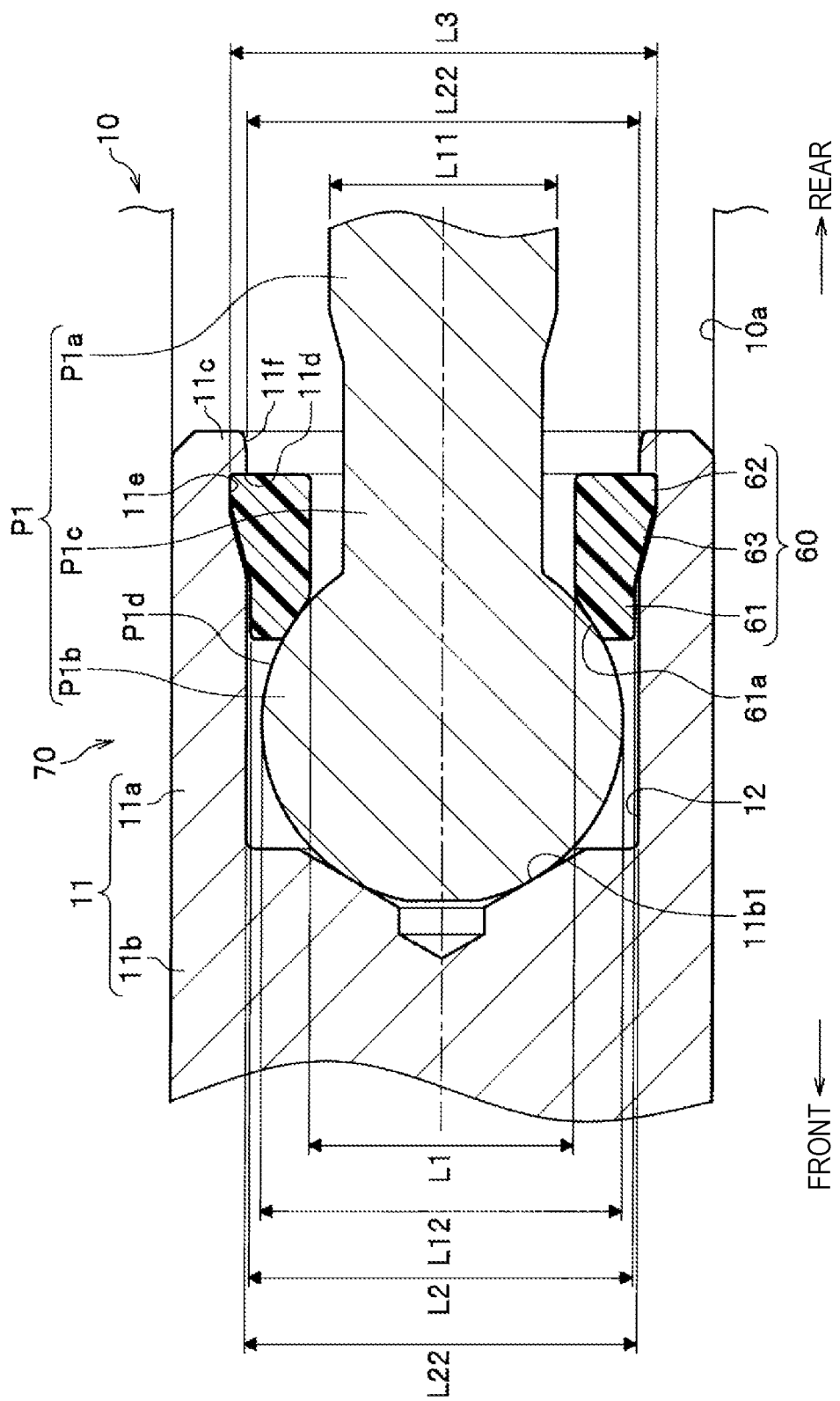
FIG. 2 is a cross-sectional view illustrating the input device according to the embodiment of the present disclosure.

The master cylinder 10 is a tandem type having, for example, two pistons 11 (only one of which is shown in FIG. 2) in its cylinder bore 10a (see FIG. 2). The master cylinder 10 generates a brake fluid pressure in response to an operation on a brake pedal (an operation element) (in response to the amount of operation). The fluid pressure generated by the master cylinder 10 acts on the individual wheel cylinders of the wheel brakes (not shown in the drawings). The master cylinder 10 is connected to the stroke simulator 20. The stroke simulator 20 is a simulator mechanism configured to generate a brake fluid pressure for creating an operation reaction force for a driver.

The slave cylinder 30 is an actuator for generating a brake fluid pressure corresponding to an operation force of the driver. The slave cylinder 30 generates a brake fluid pressure as the electric motor 31 (an electric actuator) is driven according to the amount of operation on the brake pedal. The fluid pressure generated by the slave cylinder 30 acts on the individual wheel cylinders (not shown in the drawings). The electric motor 31 is an electric servo motor which is driven and controlled by the fluid pressure control device 40. A driving force of the electric motor 31 is transmitted to the slave cylinder 30 by a transmission mechanism (not shown in the drawings) using components such that a belt.

The fluid pressure control device 40 has a configuration capable of performing a variety of fluid pressure control such as antilock brake control and motion stability control by controlling the fluid pressure of brake fluid to act on the individual wheel cylinders of the wheel brakes. The fluid pressure control device 40 contains a control board (not shown in the drawings), and is attached to one side surface 1a of the base 2 (see FIG. 1). The fluid pressure control device 40 controls motion of the electric motor 31, opening or closing of the electromagnetic valves of the base 2, and switching of the changeover valves, on the basis of information (detected values) obtained from various sensors such as pressure sensors and stroke sensors, programs stored in advance, and so on.

As shown in FIG. 2, one end part of one piston (a secondary piston) 11 of the master cylinder 10 is fit on a pushrod P1. An end part (not shown in the drawings) of the pushrod P1 is connected to the brake pedal (the operation element). The secondary piston 11 and the other piston 11 (a primary piston) (not shown in the drawings) slide inside the cylinder bore 10a in response to a force applied to the brake pedal, thereby pressing the brake fluid contained in a pressure chamber formed inside the cylinder bore 10a. The pressed brake fluid is output into the hydraulic passages through output ports (not shown in the drawings).

An end part of the pushrod P1 is held in a cylindrical member 60, so as to be swingable with respect to the secondary piston 11. In other words, the pushrod P1 is tiltable with respect to the central axis of the cylindrical member 60. Also, in the following description, the opening side of the cylinder bore 10a will be defined as the rear side, and the opposite side to the opening side in the axial direction will be defined as the front side.

As shown in FIG. 2, an input device 70 includes the pushrod P1, the secondary piston 11, and the cylindrical member 60. The pushrod P1 is an input rod capable of forward and rearward movement in a front-rear direction in response to the amount of operation on the brake pedal by the driver as described above. The pushrod P1 has an axial part P1a and a spherical head part P1b as a single body (see FIG. 3). The axial part P1a has a columnar shape extending in the front-rear direction. The spherical head part P1b is formed at the front end part of the axial part P1a. The leading end part of the axial part P1a (the end part close to the head part P1b) is a small-diameter part P1c having a diameter smaller than that of the other part of the axial part P1a. The head part P1b is stored inside a rear cylindrical part 11a of the secondary piston 11.

The secondary piston 11 is a piston which can be displaced in the front-rear direction in response to forward and rearward movement of the pushrod P1. The secondary piston 11 has a front cylindrical part (not shown in the drawings), the rear cylindrical part 11a, and a base part 11b formed therebetween, as a single body. The rear cylindrical part 11a is a cylinder having a rear surface 11b1 of the base part 11b as its bottom surface. The rear cylindrical part 11a has an opening on the side where the pushrod P1 is provided. Into the rear cylindrical part 11a, the head part P1b of the pushrod P1 and the cylindrical member 60 are inserted. Also, the rear surface 11b1 of the base part 11b includes a tapered surface with which the head part P1b of the pushrod P1 comes into contact.

Figure 3:
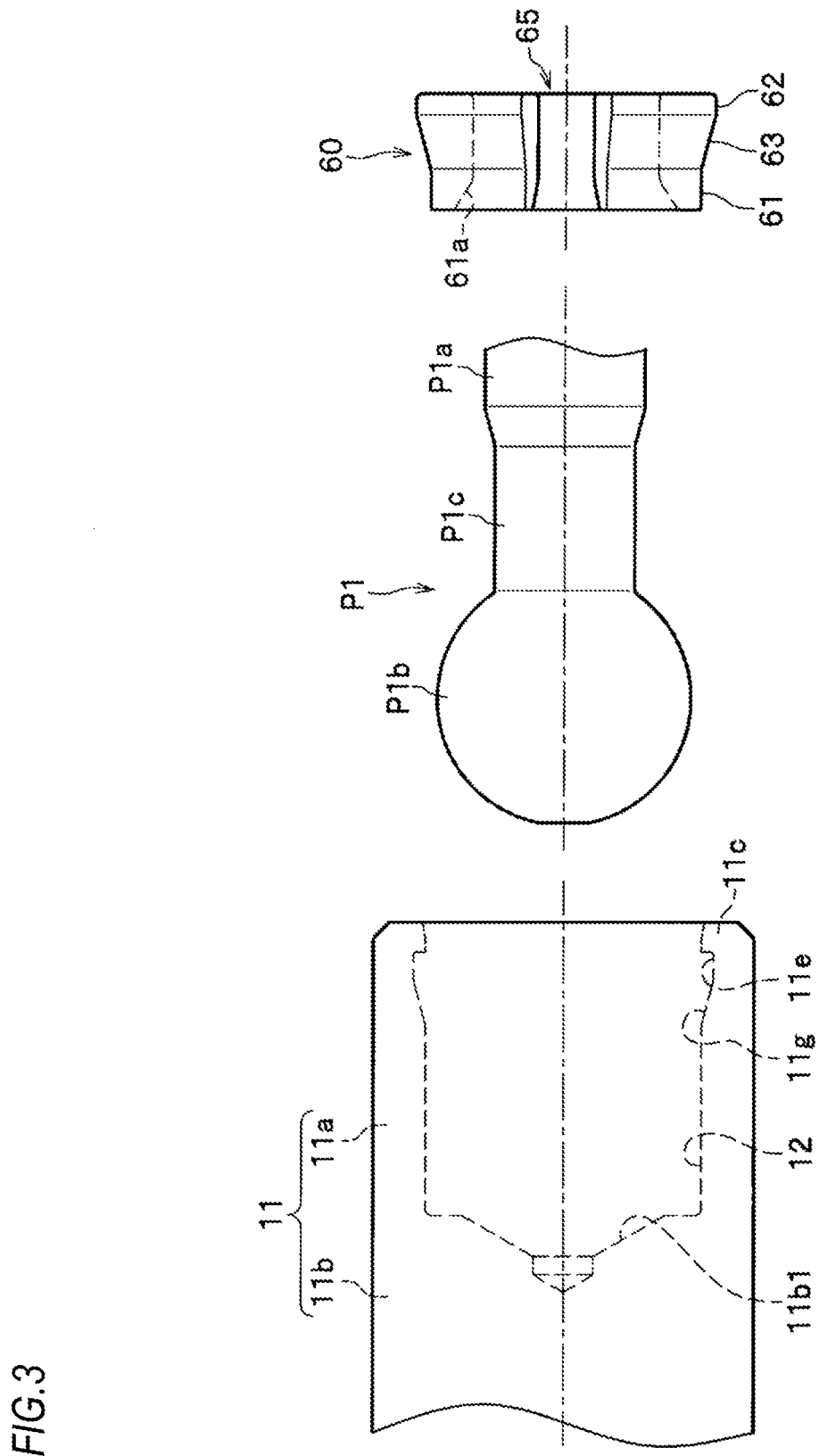
FIG. 3 is an exploded view illustrating the input device according to the embodiment of the present disclosure.

The rear end part (the opening edge part) of the rear cylindrical part 11a has an annular protrusion 11c protruding toward the center in the radial direction of the secondary piston 11 (see FIG. 3). A front surface 11d of the annular protrusion 11c, and an inner circumferential surface 11e of the rear cylindrical part 11a connected to the front surface 11d function as an engaging part which is engaged with a locking part 62 of the cylindrical member 60. Also, the rear end part of the rear cylindrical part 11a (that is, the rear end part of the inner circumferential surface of the annular protrusion 11c) has an inclined surface 11f formed such that the diameter of the rear end part increases as it goes from the bottom surface side toward the opening side. The inclined surface 11f functions as a guide surface when the cylindrical member 60 is inserted into the rear cylindrical part 11a.

Figure 6A:
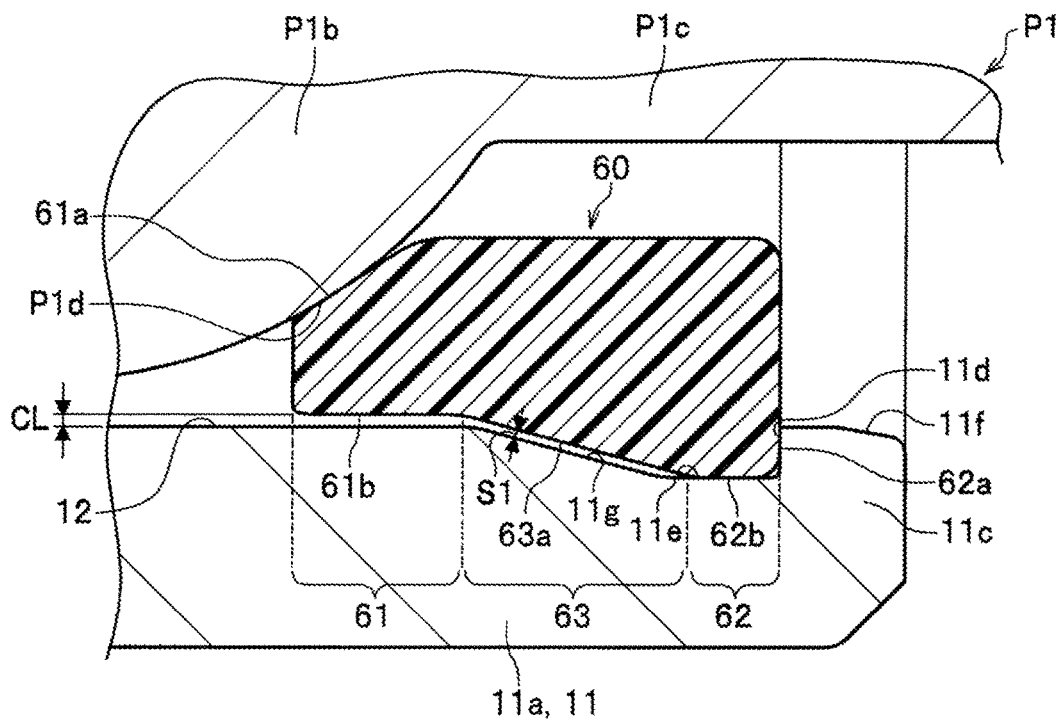
FIG. 6A is an enlarged cross-sectional view illustrating a clearance.

The cylindrical member 60 is a resin member which is fit on an end part of the pushrod P1. The cylindrical member 60 is fit on the pushrod P1, and then is inserted into the rear cylindrical part 11a of the secondary piston 11. As shown in FIGS. 2 and 6A, the cylindrical member 60 has a rod receiving part 61 having a small diameter, the locking part 62 having a large diameter, and a middle part 63 connecting the rod receiving part 61 and the locking part 62, as a single body.

As shown in FIG. 2, the rod receiving part 61 is a front part of the cylindrical member 60. The rod receiving part 61 abuts on the head part P1b of the pushrod P1. An inner circumferential surface 61a of the front end part of the rod receiving part 61 is an inclined surface formed such that the diameter of the front end part increases as it goes from the rear side toward the front side. The inner circumferential surface 61a corresponds to an arc of an outer circumferential surface P1d of the head part P1b of the pushrod P1, and abuts on the outer circumferential surface P1d.

As shown in FIG. 6A, an outer circumferential surface 61b of the rod receiving part 61 is formed substantially in parallel to an inner circumferential surface 12 of the secondary piston 11, and faces the inner circumferential surface 12 with a clearance CL. The clearance CL is formed so as to be substantially uniform in the circumferential direction.

As shown in FIG. 2, the locking part 62 is a rear part of the cylindrical member 60. The inner circumferential surface of the locking part 62 faces the outer circumferential surface of the small-diameter part P1c of the pushrod P1, with a gap. As shown in FIG. 6A, a circumferential surface 62a of the rear end of the locking part 62 abuts on the front surface 11d of the annular protrusion 11c, and an outer circumferential surface 62b of the rear end of the locking part 62 abuts on the inner circumferential surface 11e of the rear cylindrical part 11a. The circumferential surface 62a and outer circumferential surface 62b of the rear end of the locking part 62 are formed so as to be at a right angle as seen in a cross-sectional view.

The middle part 63 is a central part of the cylindrical member 60. Similarly to the locking part 62, the inner circumferential surface of the middle part 63 faces the outer circumferential surface of the small-diameter part P1c of the pushrod P1, with a gap. An inclined outer circumferential surface 63a of the middle part 63 is an inclined surface formed in a tapered shape such that the diameter of the middle part gradually increases as it goes from the front side toward the rear side. As shown in FIG. 6A, the inclined outer circumferential surface 63a is formed substantially in parallel to an inclined inner circumferential surface 11g of the secondary piston 11 formed in a tapered shape. The inclined outer circumferential surface 63a faces the inclined inner circumferential surface 11g, with a gap S1. The gap S1 is formed so as to be substantially uniform in the circumferential direction.

The inclined inner circumferential surface 11g of the secondary piston is an inclined surface connecting the inner circumferential surface 12 and the inner circumferential surface 11e of the rear cylindrical part 11a.

As shown in FIG. 2, the locking part 62 and the middle part 63 of the cylindrical member 60 have the same inside diameter L1 (see FIG. 4C). The inside diameter L1 is larger than the largest outside diameter L11 of the axial part P1a of the pushrod P1, and is smaller than the largest outside diameter L12 of the head part P1b.

Also, the outside diameter L2 of the rod receiving part 61 is larger than the largest outside diameter L12 of the head part P1b of the pushrod P1, and is slightly smaller than the inside diameter L22 of the inner circumferential surface 12 of the secondary piston 11. Also, the inside diameter of the annular protrusion 11c of the secondary piston 11 is the same as the inside diameter L22 of the inner circumferential surface 12. In other words, the size of the rod receiving part 61 is set such that the rod receiving part can be inserted into the annular protrusion 11c of the secondary piston 11.

The inner circumferential surface 61a of the rod receiving part 61 abuts on a part of the outer circumferential surface of the head part P1b of the pushrod P1 closer to the axial part P1a than to a largest-diameter part of the head part P1b. The rod receiving part 61 is brought into contact with a part of the head part P1b of the pushrod P1 closer to the axial part P1a than to the largest-diameter part, thereby being elastically deformed in some degree toward the outer side in the radial direction and pressing the head part P1b of the pushrod P1 against the rear surface 11b1 of the base part 11b of the secondary piston 11 by its resilience (recovering force).

Also, in this pressed state, as shown in FIG. 6A, the outer circumferential surface 61b of the rod receiving part 61 is disposed substantially in parallel to the inner circumferential surface 12 of the secondary piston 11 so as to face the inner circumferential surface 12 with the clearance CL.

As shown in FIG. 2, the largest outside diameter L3 of the rear end part of the locking part 62 is larger than the inside diameter L22 of the annular protrusion 11c of the secondary piston 11, and is equal to or slightly larger than the inside diameter of the inner circumferential surface 11e of the rear cylindrical part 11a. The locking part 62 can be elastically deformed toward the inner side in the radial direction such that it can be inserted into the annular protrusion 11c.

As shown in FIGS. 4A and 4B, the cylindrical member 60 has a slit 65 formed over the length of the whole of the cylindrical member in the axial direction. The slit 65 is a groove-shaped notch extending in the front-rear direction, and is formed straightly along the axial direction. The front end part of the slit 65 is opened toward the front end part of the rod receiving part 61. The rear end part of the slit 65 is opened toward the rear end part of the locking part 62. The slit 65 divides the rod receiving part 61, the middle part 63, and locking part 62 in the circumferential direction of the cylindrical member 60. The cylindrical member 60 is formed substantially in a "C" shape as seen in a front view by the slit 65 (see FIG. 4B).

As shown in FIG. 4B, side surfaces 65*a* and 65*a* of the slit 65 are formed along planes D1 and D2 (shown by broken lines in FIG. 4B) including a central axis O1 of the cylindrical member 60, and face each other in the circumferential direction, with a predetermined gap.

The cylindrical member 60 can elastically deform in the radial direction due to the slit 65. The slit 65 is formed over the length of the whole of the cylindrical member in the axial direction. The slit 65 makes it possible for the whole of the cylindrical member 60 to be deformed toward the inner side or the outer side in the radial direction.

Also, the slit 65 is not limited to a slit formed along the planes D1 and D2 including the central axis O1. As long as the cylindrical member 60 can elastically deform, particularly, as long as the cylindrical member can elastically deform toward the inner side in the radial direction during assembling as will be described below, the slit may be formed in the cylindrical member 60 along planes parallel to each other.

Also, similarly, as long as the cylindrical member 60 can elastically deform in the radial direction, the slit 65 may have a shape in which the width gradually increases as it goes from the front side toward the rear side, or from the rear side toward the front side, in the axial direction.

Also, similarly, as long as the cylindrical member 60 can elastically deform in the radial direction, the slit 65 may have a shape in which the width gradually increases or decreases as it goes from the central part (the middle part 63) toward the front side and from the central part (the middle part 63) toward the rear side.

Figure 5A:
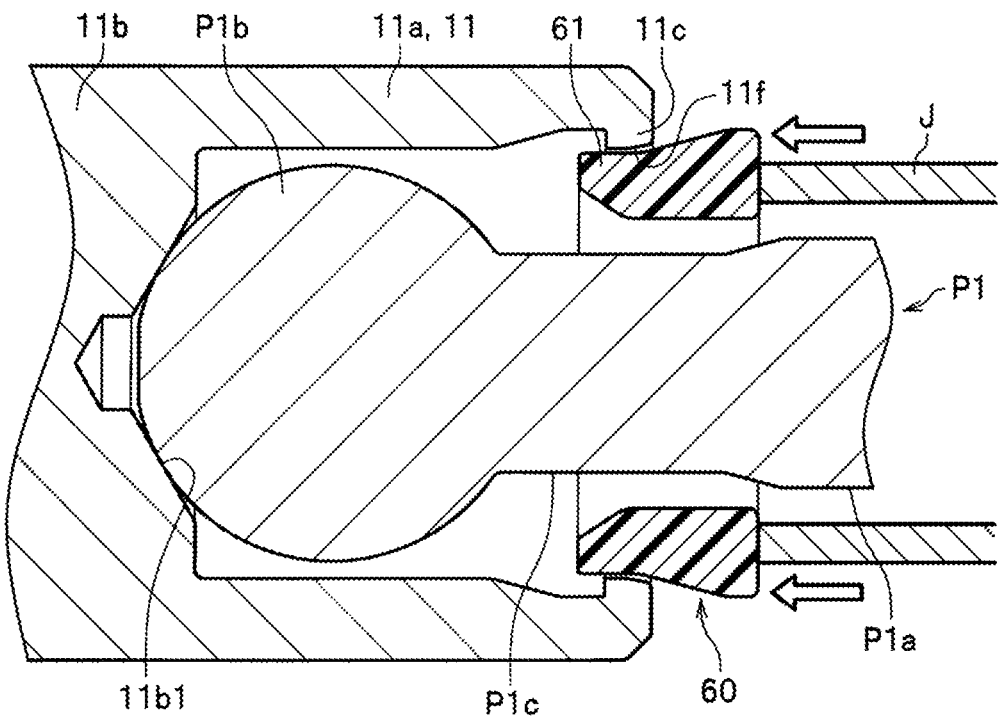
FIGS. 5A and 5B are views for explaining a method of assembling the input device according to the embodiment of the present disclosure.
Figure 5B:
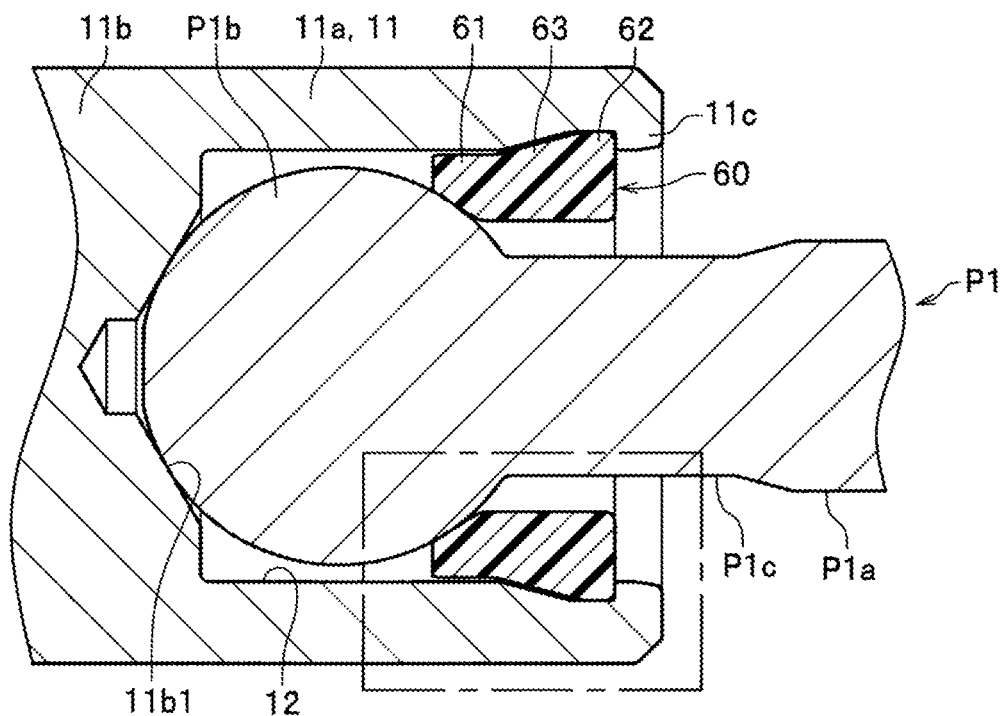

Now, a method of assembling the input device will be described with reference to FIGS. 5A and 5B. First, as shown in FIG. 5A, the cylindrical member 60 is fit on the axial part P1*a* of the pushrod P1. In this state, the head part P1*b* of the pushrod P1 is inserted into the rear cylindrical part 11*a* of the secondary piston 11.

At this time, the head part P1*b* of the pushrod P1 is appropriately guided inside the rear cylindrical part 11*a* by the inclined surface 11*f* of the annular protrusion 11*c*. In this way, the leading end part of the head part P1*b* is brought into contact with the rear surface 11*b*1 of the base part 11*b*.

In this state, the cylindrical member 60 is inserted into the rear cylindrical part 11*a* of the secondary piston 11, for example, with a cylindrical jig J. Specifically, the rear end part of the cylindrical member 60 is brought into contact with the jig J, and the cylindrical member 60 is pressed toward the front side with the jig J, whereby the cylindrical member 60 is moved toward the front end part of the pushrod P1.

At this time, the rod receiving part 61 of the cylindrical member 60 is appropriately inserted into and guided in the rear cylindrical part 11*a* by the inclined surface 11*f* of the annular protrusion 11*c*. Also, since the middle part 63 and the locking part 62 of the cylindrical member 60 have the slit 65, they can be inserted into the rear cylindrical part 11*a* while elastically deforming toward the inner side in the radial direction. If the locking part 62 is inserted into the rear cylindrical part 11*a*, as shown in FIG. 5B, the middle part 63 and the locking part 62 recover toward the outer side in the radial direction.

Also, in this state, the circumferential surface 62*a* of the rear end of the locking part 62 abuts on the front surface 11*d* of the annular protrusion 11*c*, and the outer circumferential surface 62*b* of the rear end of the locking part 62 abuts on the inner circumferential surface 11*e* of the rear cylindrical part 11*a*. Also, the rod receiving part 61 comes into contact with the outer circumferential surface P1*d* of the head part P1*b* of the pushrod P1, thereby elastically deforming due to the slit 65 and pressing the head part P1*b* of the pushrod P1 against the rear surface 11*b*1 of the base part 11*b* by its resilience (recovering force).

Subsequently, the jig J is pulled toward the rear side, and is removed. As a result, as shown in FIG. 2, assembling of the secondary piston 11, the pushrod P1, and the cylindrical member 60 of the input device 70 is completed.

Now, an action when the pushrod P1 is pulled toward the rear side will be described.

Figure 6B:
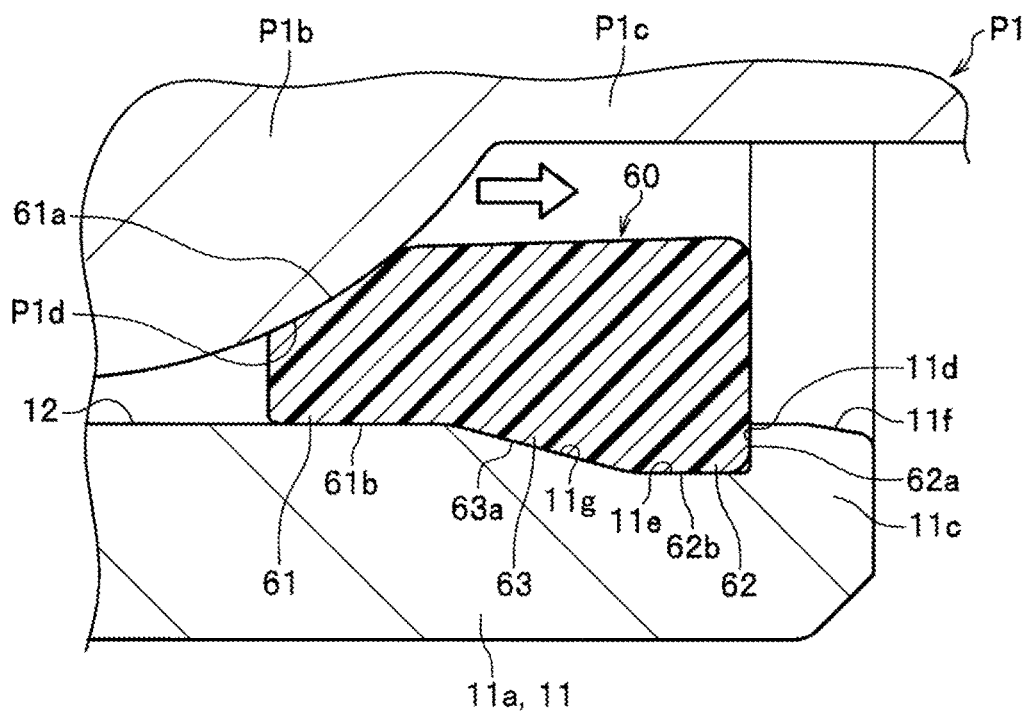
FIG. 6B is an enlarged cross-sectional view illustrating the state of the cylindrical member when the cylindrical member receives a force in such a direction that an input rod may be removed.

If the pushrod P1 of the input device 70 is pulled toward the rear side as shown in FIG. 6B by a force (a force shown by an outlined arrow in FIG. 6B), the outer circumferential surface P1*d* of the head part P1*b* of the pushrod P1 presses the inner circumferential surface 61*a* of the rod receiving part 61 of the cylindrical member 60.

If the pressing force acts on the inner circumferential surface 61*a* of the rod receiving part 61, the whole of the cylindrical member 60 is pressed against the inner circumferential surface 12 of the secondary piston 11 in such a direction that the diameter of the cylindrical member 60 increases, whereby the rod receiving part 61 and the middle part 63 elastically deform toward the outer side in the radial direction due to the slit 65. This elastic deformation toward the outer side in the radial direction causes at least a part of the outer circumferential surface 61*b* of the rod receiving part 61 and the inclined outer circumferential surface 63*a* of the middle part 63 to come into contact with the inner circumferential surface 12 of the rear cylindrical part 11*a* and the inclined inner circumferential surface 11*g*. In other words, at least a part of the outer surface of the cylindrical member 60 comes into contact with the inner surface of the secondary piston 11.

As a result, the contact area of the cylindrical member 60 with the secondary piston 11 increases, resulting in an improvement in the holding power of the cylindrical member 60.

Also, FIG. 6B shows a state where the whole of the outer surface of the cylindrical member 60 abuts on the inner surface of the secondary piston 11. In this case, since the outer circumferential surface 61*b* of the rod receiving part 61 abuts on the inner circumferential surface 12 of the secondary piston 11, and the inclined outer circumferential surface 63*a* of the middle part 63 abuts on the inclined inner circumferential surface 11*g*, the contact area of the cylindrical member 60 with the secondary piston 11 further increases.

In the input device of the present disclosure described above, locking of the pushrod P1 is implemented by the locking part 62 of the cylindrical member 60 made of a resin. Since it is possible to perform locking by assembling the cylindrical member 60 in the above-described way, it is possible to omit a process of swaging the secondary piston 11, and thus it is possible to improve the productivity while reducing the cost.

Since the slit 65 is formed over the length of the whole of the cylindrical member in the axial direction, it is possible to elastically deform the whole of the cylindrical member 60 in the radial direction. Therefore, during assembling, it is possible to insert the cylindrical member into the secondary piston 11 by deforming the whole of the cylindrical member 60 toward the inner side in the radial direction. Therefore, assembling is very easy. Also, for example, when the cylindrical member 60 receives a force in such a direction that the pushrod P1 may fall off the secondary piston 11, it is possible to bring the whole of the outer surface of the cylindrical member 60 into contact with the inner side of the secondary piston 11 by deforming the whole of the cylindrical member 60 toward the outer side in the radial direction. In this case, since the contact area of the cylindrical member 60 with the secondary piston 11 increases, resulting in an increase in withstand load, appropriate locking of the pushrod P1 is implemented.

Also, since the slit 65 can cause resilience of the rod receiving part 61 relative to the end part of the pushrod P1, it is possible to eliminate backlash of the pushrod P1 in the axial direction. As a result, the driver can achieve an operational feeling without a sense of discomfort.

Also, since the slit 65 is formed straightly along the axial direction, the configuration is simple. Therefore, the cost of the input device 70 decreases while the productivity improves.

Also, since the side surfaces 65a and 65a of the slit 65 are formed along the radial direction of the cylindrical member 60, it is possible to easily form the slit 65 with a predetermined width. Also, even though the slit has a requisite minimum width, it is possible to improve holding of the pushrod P1 during a normal time while making it possible for the cylindrical member 60 to deform toward the inner side in the radial direction during assembling, and it is possible to appropriately implement deformation of the cylindrical member 60 toward the outer side in the radial direction when the cylindrical member receives a force in such a direction that the pushrod may fall off the secondary piston.

FIGS. 7A to 7C are views illustrating a modification of the cylindrical member which can be applied to the input device according to the present disclosure. In a cylindrical member 60A shown in FIGS. 7A to 7C, a slit 65A has a crank shape as seen in a side view. The slit 65A is composed of a first slit 651, a second slit 652, and a third slit 653, and is formed over the length of the whole of the cylindrical member 60A in the axial direction.

The first slit 651 is formed in the rod receiving part 61. The first slit 651 is a groove-shaped notch formed in the rod receiving part 61 and extending in the front-rear direction.

The second slit 652 is formed in the locking part 62. The second slit 652 is a groove-shaped notch formed in the locking part 62 and extending in the front-rear direction. The second slit 652 and the first slit 651 are disposed so as not to be in a straight line, that is, they are disposed at different positions in the circumferential direction (positions deviated from each other in the circumferential direction).

The third slit 653 is formed in the middle part 63. The third slit 653 is a groove-shaped notch formed in the middle part 63 and extending in the circumferential direction. The third slit 653 is a slit connecting the first slit 651 and the second slit 652.

The first slit 651 and the second slit 652 are formed so as to have widths wider than that of the third slit 653. The widths of the first slit 651 and the second slit 652 are set in view of elastic deformation of the cylindrical member 60A in the radial direction.

In the input device 70 to which the cylindrical member 60A configured as described above is applied, it is possible to prevent the slit 65A from being formed only in a part of the cylindrical member 60A narrow in the circumferential direction, and it is possible to improve the holding balance of the cylindrical member 60A.

Although the present disclosure has been described above on the basis of the embodiment, the present disclosure is not limited to the components described with respect to the embodiment, and it is possible to appropriately modify the components described with respect to the embodiment, such as appropriate combinations of the components and appropriate selections from the components, without departing from the gist of the present disclosure. Also, with respect to some of the components of the embodiment, it is possible to make additions, omissions, and replacements.

For example, in the above-described embodiment, the slit 65 is formed in a straight line shape along the axial direction. However, the present disclosure is not limited thereto, and the slit may be formed in a straight line shape so as to form an angle with respect to the axial direction (so as to be inclined with respect to the axial direction).

Also, in the modification, the first slit 651 and the second slit 652 are formed along the axial direction. However, the present disclosure is not limited thereto, and the first slit and the second slit may be formed so as to form angles with respect to the axial direction (so as to be inclined with respect to the axial direction). Further, the third slit 653 is formed along the circumferential direction. However, the present disclosure is not limited thereto, and the third slit may be formed so as to form an angle with respect to the circumferential direction (so as to be inclined with respect to the circumferential direction).

The invention claimed is:

1. An input device comprising:
   an input rod capable of forward and rearward movement on the basis of an amount of operation on an operation element;
   a piston which can be displaced in response to forward and rearward movement of the input rod; and
   a cylindrical member made of a resin and fit on an end part of the input rod and the piston,
   wherein the cylindrical member comprises:
   a rod receiving part provided on one end side in an axial direction and configured to receive the end part of the input rod;
   a locking part formed on another end side in the axial direction so as to lock an engaging part of the piston, thereby preventing the input rod from falling off the piston; and
   a slit formed over a length of the whole of the cylindrical member in the axial direction, and
   wherein the cylindrical member can be elastically deformed in a radial direction due to the slit, and
   wherein an inner diameter of the rod receiving part has a larger diameter than an inner diameter of the locking part.

2. The input device according to claim 1, wherein the slit is formed in a straight line along the axial direction.

3. The input device according to claim 1, wherein the slit comprises:
   a first slit formed at least in the rod receiving part;
   a second slit formed at least in the locking part so as to have a position different from that of the first slit in a circumferential direction; and
   a third slit connecting the first slit and the second slit.

4. The input device according to claim 1,
wherein side surfaces of the slit are formed along the radial direction of the cylindrical member.

5. The input device according to claim 1,
wherein when the cylindrical member receives a force in such a direction that the input rod may fall off the piston, the cylindrical member deforms toward an outer side in the radial direction such that at least a part of an outer surface of the cylindrical member comes into contact with an inner surface of the piston.

6. The input device according to claim 5,
wherein the whole of the outer surface of the cylindrical member comes into contact with the inner surface of the piston.

7. The input device according to claim 1,
wherein an inner circumferential surface of the rod receiving part abuts on a part of an outer circumferential surface of a head part of the input rod closer to an axial part of the input rod than to a largest-diameter part of the head part.

8. The input device according to claim 1, wherein the input rod is tiltable with respect to a central axis of the cylindrical member.

9. The input device according to claim 1, wherein the input rod has an axial part and a spherical head part, as a single body, wherein
the axial part extends in a front-rear direction, with the spherical head part formed at a front end part of the axial part,
an end part of the axial part has a diameter smaller than that of another part of the axial part, and
the spherical head part is stored inside a rear cylindrical part of the piston.

10. The input device according to claim 9, wherein
the piston includes the rear cylindrical part which includes an annular protrusion protruding toward a center in the radial direction of the piston, a front surface of the annular protrusion, and an inner circumferential surface of the rear cylindrical part connected to the front surface function as the engaging part which is engaged with the locking part of the cylindrical member.

11. The input device according to claim 10, wherein
the rear cylindrical part has an inclined surface formed such that a diameter of a rear end part increases as it goes from a bottom surface side toward an opening side, and
an inner circumferential surface of a front end part of the rod receiving part is an inclined surface formed such that a diameter of the front end part increases as it goes from a rear side toward a front side.

12. The input device according to claim 11, wherein the inner circumferential surface corresponds to an arc of an outer circumferential surface of the spherical head part of the input rod, and abuts on the outer circumferential surface.

13. The input device according to claim 12, wherein
an outer circumferential surface of the rod receiving part is formed substantially parallel to an inner circumferential surface of the piston, and faces the inner circumferential surface with a clearance, and
the clearance is formed so as to be substantially uniform in a circumferential direction.

14. The input device according to claim 1, wherein
a circumferential surface of a rear end of the locking part abuts on a front surface of an annular protrusion of the piston,
an outer circumferential surface of the rear end of the locking part abuts on an inner circumferential surface of a rear cylindrical part of the piston, and
the circumferential surface and the outer circumferential surface of the rear end of the locking part are formed so as to be at a right angle as seen in a cross-sectional view.

15. The input device according to claim 1, further comprising a middle part which connects the locking part to the rod receiving part,
wherein the middle part and the locking part having a same inner diameter, smaller than the inner diameter of the rod receiving part.

16. The input device according to claim 15, wherein
the middle part is a central part of the cylindrical member and has an inner circumferential surface facing an outer circumferential surface of the input rod that is smaller than other portions of the input rod, with a gap therebetween.

17. The input device according to claim 16, wherein
an inclined outer circumferential surface of the middle part is an inclined surface formed in a tapered shape such that an outer diameter of the middle part increases from a front side toward a rear side,
the inclined outer circumferential surface is formed substantially in parallel to an inclined inner circumferential surface of the piston which is formed in the tapered shape, and
the inclined outer circumferential surface faces the inclined inner circumferential surface of the piston, with the gap therebetween, in a circumferential direction.

18. The input device according to claim 1,
wherein the slit is composed of a first slit, a second slit, and a third slit, and is formed over the length of the whole of the cylindrical member in the axial direction.

19. The input device according to claim 18, wherein
the first slit is formed in the rod receiving part and extends in a front-rear direction,
the second slit is formed in the locking part and extending in the front-rear direction, and
the third slit is a in the middle part and extending in a circumferential direction.

20. The input device according to claim 19, wherein
the third slit connects the first slit and the second slit,
the second slit and the first slit are disposed so as not to be in a straight line with respect to each other, and
the first slit and the second slit are formed so as to have widths wider than that of the third slit.

* * * * *